United States Patent
Dollinger

(10) Patent No.: US 8,509,421 B2
(45) Date of Patent: Aug. 13, 2013

(54) METHOD AND DEVICE FOR CHECKING A SUBSCRIBER LINE

(75) Inventor: Rudolf Dollinger, Munich (DE)

(73) Assignee: Adtran GmbH, Berlin-Siemensstadt (DE)

(*) Notice: Subject to any disclaimer, the term of this patent is extended or adjusted under 35 U.S.C. 154(b) by 1459 days.

(21) Appl. No.: 12/083,649

(22) PCT Filed: Oct. 14, 2006

(86) PCT No.: PCT/EP2006/009941
§ 371 (c)(1),
(2), (4) Date: Apr. 15, 2008

(87) PCT Pub. No.: WO2007/045410
PCT Pub. Date: Apr. 26, 2007

(65) Prior Publication Data
US 2009/0201979 A1      Aug. 13, 2009

(30) Foreign Application Priority Data
Oct. 20, 2005 (DE) .......................... 10 2005 050 341

(51) Int. Cl.
*H04M 1/00* (2006.01)
*H04M 1/24* (2006.01)

(52) U.S. Cl.
USPC .................................. 379/399.01; 379/26.02

(58) Field of Classification Search
USPC ................. 379/9.06, 24, 27.03, 27.06, 32.01, 379/399.01–399.02; 375/224
See application file for complete search history.

(56) References Cited

U.S. PATENT DOCUMENTS

| | | | | |
|---|---|---|---|---|
| 4,910,768 A | * | 3/1990 | Sues et al. | 379/394 |
| 5,559,854 A | * | 9/1996 | Suzuki | 379/29.01 |
| 5,917,885 A | | 6/1999 | Berken et al. | |

(Continued)

FOREIGN PATENT DOCUMENTS

| | | |
|---|---|---|
| AT | 406 435 B | 5/2000 |
| EP | 0 505 670 A2 | 9/1992 |
| WO | WO 03/030392 A1 | 4/2003 |
| WO | WO 2004/099711 A1 | 11/2004 |

OTHER PUBLICATIONS

Derwent Abstract—WO 03/030392 A1; Apr. 10, 2003; France Telecom, F-75015 Paris, France.

(Continued)

*Primary Examiner* — Simon Sing
*Assistant Examiner* — Jeffrey Lytle
(74) *Attorney, Agent, or Firm* — Laurence A. Greenberg; Werner H. Stemer; Ralph E. Locher

(57) ABSTRACT

In a method for checking a subscriber line with a first and a second electrical line, wherein each line is connected to an encoder/decoder via a subscriber line circuit, the first line is connected to ground, a resistance of the second line is increased, an audio signal is outputted from the encoder/decoder to the first line; and a first frequency-selective signal is measured at a point at which the encoder/decoder is connected to the first line. Further, the second line is connected to ground, a resistance of the first line is increased, a further audio signal is output from the encoder/decoder to the second line, and a second frequency-selective signal is measured at a point at which the encoder/decoder is connected to the second line. An amplitude difference between the first and second frequency-selective signals is ascertained.

6 Claims, 2 Drawing Sheets

(56) References Cited

U.S. PATENT DOCUMENTS

| | | |
|---|---|---|
| 6,385,297 B2 * | 5/2002 | Faulkner et al. ............. 379/1.04 |
| 6,389,109 B1 * | 5/2002 | Schmidt et al. ............. 379/1.04 |
| 2002/0176542 A1 * | 11/2002 | Lazarus et al. .................... 379/3 |
| 2003/0007605 A1 | 1/2003 | Rosen et al. |
| 2005/0258841 A1 * | 11/2005 | Blechschmidt et al. ...... 324/713 |

OTHER PUBLICATIONS

Derwent Abstract—EP 0 505 670 A2; Sep. 30, 1992; Bosch Telecom Öffentliche Vermittlungstechnik GmbH, D-6236 Eschborn, Germany.

Derwent Abstract —AT 406 435 B; May 25, 2000; Ericsson Austria AG, A-1120 Wien, Austria.

* cited by examiner

METHOD AND DEVICE FOR CHECKING A SUBSCRIBER LINE

CROSS-REFERENCE TO RELATED APPLICATIONS

The present application is a national stage application of International Application No. PCT/EP2006/009941, filed on Oct. 14, 2006, which claims priority to German Patent Application No. 10 2005 050 341.1, filed on Oct. 20, 2005, both of which are incorporated herein by reference.

BACKGROUND OF THE INVENTION

The invention relates to a method for checking a subscriber line, preferably with an analog/digital subscriber line circuit for an analog telephone, and to device for checking a subscriber line.

In this context, a telecommunication station is connected to the subscriber line (known as SLCA=Subscriber Line Circuit A) by means of two electrical lines (wires). The subscriber line has a subscriber line circuit and an (analog/digital) encoder/decoder which allow connection to a digital telecommunication network. In the event of complaints from subscribers or to check assured properties, it is necessary to test the proper operation of the subscriber line circuit. One of these tests fundamentally involves measuring a degree of symmetry at inputs of the subscriber line circuit, for example because a common mode interference signal there in the event of any asymmetry adversely affects the signal quality of the subscriber line circuit.

For the purpose of ascertaining this asymmetry, a first exemplary embodiment is shown in FIG. 1. Connections of a subscriber station, i.e. inputs (wires a, b) of a subscriber line circuit SLCA with a first circuit SLIC (Subscriber Line Integrated Circuit) which supplies the wires and an encoder/decoder CODEC (Coder-Decoder), have an external meter EM connected to them which is used to generate a tone Uext and to simultaneously feed it via outputs of the meter EM into a respective wire a, b via a resistance RVa, RVb (e.g. 300 Ohms) in DC-decoupled fashion. This tone forms a common mode signal and, following reflection at the subscriber line circuit, is measured as a voltage Uqu between the outputs of the meter EM. The measured voltage Uqh provides a measure of the asymmetry in the subscriber line circuit. However, this method requires the use of an external meter.

The invention is based on the object of ascertaining a degree of asymmetry between two connections on a subscriber communication station without using an external meter.

In this context, a method for checking a subscriber line with a first and a second electrical line which are each connected to an encoder/decoder via a subscriber line circuit is first of all presented. The fact that:

A)
the first line is connected to an electrical ground,
a resistance of the second line is increased to a high value (or such that no current flows in the open line),
the encoder/decoder outputs an audio signal into the first line which is furthermore reflected in the first line,
a first frequency-selective signal is measured therefrom at the point at which the encoder/decoder is connected to the first line,
the resistance of the second line is reset and the first line is connected to its original connection, B)
the second line is connected to the electrical ground,
a resistance of the first line is increased to a high value,
the encoder/decoder outputs a further audio signal into the second line which is likewise reflected in the second line,
a second frequency-selective signal is measured therefrom at the point at which the encoder/decoder is connected to the second line, C)
an amplitude difference between the first and second frequency-selective signals is ascertained

SUMMARY OF THE INVENTION allows the asymmetry in the subscriber line to be measured directly from the amplitude difference.

In other words, it is merely necessary for the two sequential measuring sequences A) and B) to take place in order for the asymmetry to be ascertained with step C). In this context, the connection of a first instance of the lines to the ground, the increase in the resistance of the other of the lines, the output of an audio signal into the first of the lines and the measurement of the frequency-selective signal therein can be controlled centrally, e.g. from a telecommunications service centre using an activation signal. The connections to the electrical ground or to a high-resistance line, and the connection for the purpose of output/pickup of an audio signal or of a frequency-selective signal can advantageously be integrated internally in the subscriber line (subscriber line circuit SLIC and/or encoder/decoder CODEC as per the previous FIG. 1), so that no external meter is required.

In terms of an apparatus, an associated device for checking a subscriber line with a first and a second electrical line which are connected to an encoder/decoder via a subscriber line circuit is also described.

The fact that the encoder/decoder has a tone generator and a frequency-selective measuring unit which are able to be controlled sequentially on the basis of a first and a second configuration, which means that the first configuration is formed by virtue of first connection of the first line to the electrical ground, by virtue of an increase in the resistance of the second line, by virtue of output of an audio signal from the tone generator into the first line and by virtue of connection or activation of the frequency-selective measuring unit at the point at which the encoder/decoder is connected to the first line, and also that the second configuration is formed by virtue of connection of the second line to the ground, by virtue of an increase in the resistance of the first line, by virtue of output of an audio signal from the tone generator into the second line and by virtue of connection of the frequency-selective measuring unit to the point at which the encoder/decoder is connected to the second line and then that the measuring unit comprises a differentiator which can be used to ascertain an amplitude difference between the first and second frequency-selective signals allows the asymmetry of the subscriber line to be measured directly from the amplitude difference. The frequency-selective signals are simply reflected physically into the line in the relevant on the basis of the previously supplied audio signal.

To connect a line to the electrical ground or to connect a high resistance in the other line, a single first controllable switch can connect one of the two lines to the ground. This switch is arranged or fixed in the region of the connections of the lines and of the subscriber line circuit (see subscriber line circuit SLIC in FIG. 1), so that it forms an internal part of the subscriber line.

In addition, a second controllable switch can connect the tone generator selectively and at the same time the measuring unit to one of the two lines. This second switch can be arranged in the encoder/decoder and controlled by external means with the first switch, so that all the controllable switches can be switched together for a respective one of the sequential measuring sequences.

BRIEF DESCRIPTION OF THE SEVERAL VIEWS OF THE DRAWINGS

The invention will now be explained using an exemplary embodiment with reference to the drawings, in which.

DETAILED DESCRIPTION OF THE INVENTION

Figure 1:
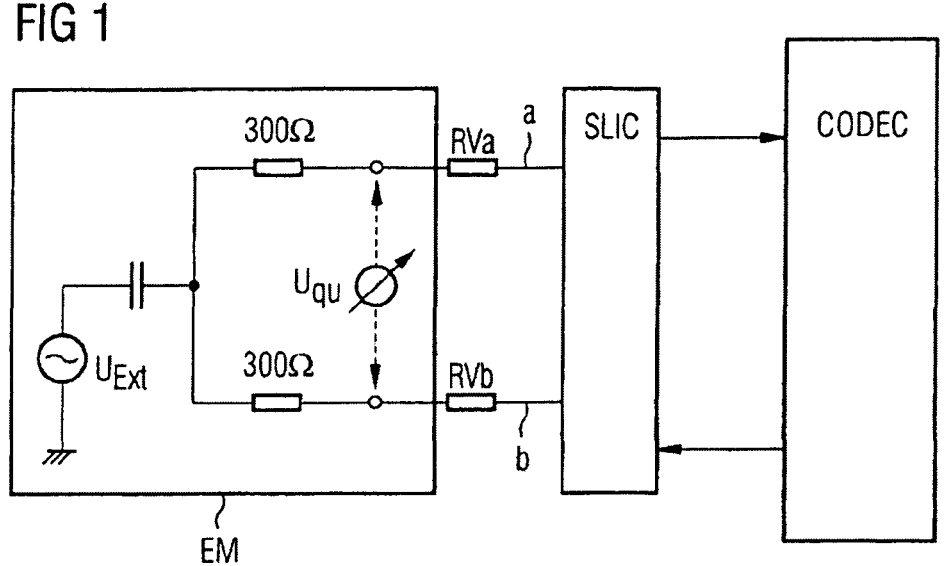
FIG. 1 shows a device for ascertaining a degree of symmetry at inputs of a subscriber line circuit.
Figure 2:
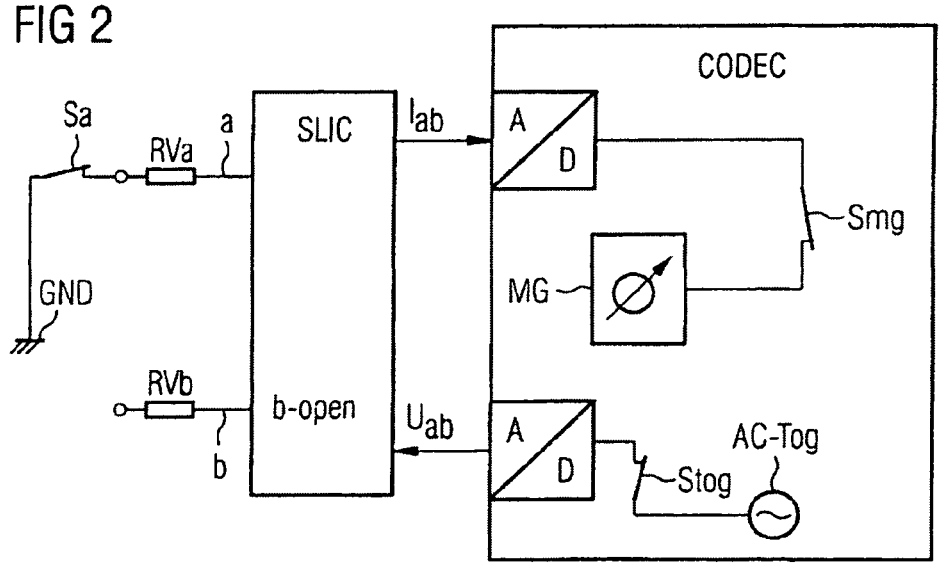
FIG. 2 shows an inventive device for a first measuring sequence.

FIG. 2 shows an inventive device for the previously cited first measuring sequence A), in which a method for checking a subscriber line with a first and a second electrical line a, b, which are each connected to an encoder/decoder CODEC via a subscriber line circuit SLIC is first of all used to connect the first line a to the electrical ground GND. In this context, a resistance RVb of the second line b is also increased. This can be done by connecting the line b to a further parallel high-resistance line. The high value of the resistance is defined or set prior to the measuring sequence. If the lines a, b are connected in this manner, the first measuring sequence can actually be initiated by virtue of the encoder/decoder CODEC outputting an audio signal Uab into the first line a and a first frequency-selective (reflected) signal Iab being measured at the point at which the encoder/decoder CODEC is connected to the first line a. This measures the total impedance of the first line a.

For reasons of clarity, FIG. 2 (and the subsequent FIG. 3) shows the high-resistance connection or the increase in the resistance of the lines a, b for the two measuring sequences A) and B) externally to the subscriber line circuit SLIC, but the switches required for this are arranged on the connections of the lines a, b of the subscriber line circuit SLIC internally. They can also be arranged externally, however.

What is not shown, but is simple to deduce, is the second measuring sequence B), in which the lines a, b are changed over in reverse to the measuring sequence A) and a further audio signal is output and a second frequency-selective signal is measured on reversed lines. To be more precise, the second line b is accordingly connected to the ground, a resistance RVa of the first line a is increased, the encoder/decoder CODEC outputs the further audio signal into the second line b and the second frequency-selective signal is measured at the point at which the encoder/decoder CODEC is connected to the second line b. This allows an amplitude difference between the first and second frequency-selective signals to be ascertained from which the asymmetry between the two connections on the lines a, b is read off directly.

In this context, the encoder/decoder CODEC has a tone generator AC-Tog and a frequency-selective measuring unit Mg which can be controlled sequentially on the basis of a first and a second configuration, which means that the first configuration is formed by virtue of the first connection of the first line a to the ground GND, by virtue of an increase in the resistance RVb of the second line b, by virtue of the output of the audio signal Uab from the tone generator AC-Tog into the first line a and by virtue of the connection of the frequency-selective measuring unit MG to the point at which the encoder/decoder CODEC is connected to the first line a, and then the second configuration is now formed by virtue of the connection of the second line b to the ground, by virtue of the increase in the resistance RVa of the first line a, by virtue of the output of a further audio signal from the tone generator AC-Tog into the second line b and by virtue of the connection of the frequency-selective measuring unit MG to the point at which the encoder/decoder CODEC is connected to the second line b. To ascertain the amplitude difference between the two measured frequency-selective signals, the measuring unit can comprise a differentiator or may be connected to a differentiator.

FIG. 2 also shows a possible advantageous connection apparatus. A first controllable switch Sa is arranged at the point at which the subscriber line circuit SLIC is connected to the line a, so that it is possible to connect to the electrical ground GND as desired. Similarly, two further controllable switches Smg, Stog are used in the encoder/decoder CODEC, these respectively being arranged between an analog/digital converter A/D at one connection of the encoder/decoder CODEC and the measuring unit MG or the tone generator AC-Tog. All the controllable switches are switched together, so that the measuring sequence A) takes place properly as shown in FIG. 2. Analog connections of the analog/digital converters A/D in the encoder/decoder CODEC are connected to the lines a, b via connections of the subscriber line circuit SLIC.

Figure 3:
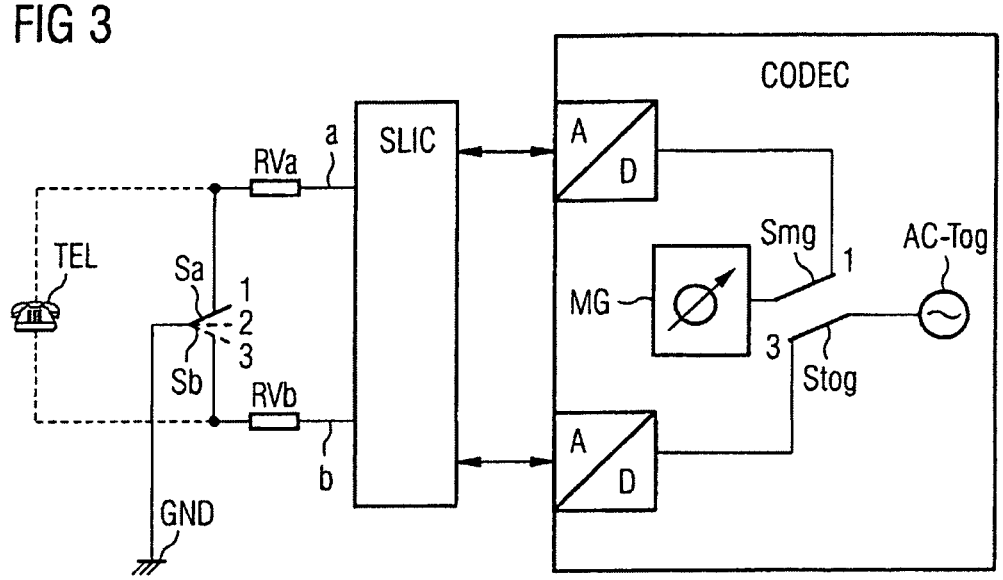
FIG. 3 shows an inventive device with a complete connection apparatus.

Finally, FIG. 3 shows an inventive device as shown in FIG. 2 with a complete connection apparatus. In this case, as an addition to FIG. 2, a controllable switch Sb is shown for the line b at the point at which the subscriber line circuit SLIC is connected to the line b. The switch Sb is actually the switch Sa (in a position 1 for the measuring sequence A)) from FIG. 2, but in a position 3 for the measuring sequence B). Should the subscriber line not be checked, the switch Sa, Sb can be put into a position 2 which prevents the lines a, b from being connected to the ground GND, but allows connection to an analog telephone TEL, for example, via the lines a, b.

For reasons of graphical clarity, FIG. 3 shows the switch Smg for the measuring unit MG in the encoder/decoder CODEC for position 1 of the switch Sa, i.e. for the measuring sequence A), but shows the switch Stog for the tone generator AC-Tog for position 3 of the switch Sb, i.e. for the measuring sequence B). The switches Smg, Stog can naturally be put into each of the positions 1, 2, 3 on the basis of the switches Sa, Sb in sync with the switches Sa, Sb.

The invention claimed is:

1. A method for checking a subscriber line circuit with a first and a second electrical line, wherein each line is connected to an encoder/decoder of a codec via a subscriber line circuit, the codec including a frequency selective measuring unit, the method comprising:

connecting the first line to ground;
increasing a resistance of the second line;
outputting from the encoder/decoder an audio signal to the first line;
measuring, via the measuring unit, a first frequency-selective signal at a point at which the encoder/decoder is connected to the first line;
connecting the second line to ground;
increasing a resistance of the first line;
outputting from the encoder/decoder a further audio signal to the second line;
measuring, via the measuring unit, a second frequency-selective signal at a point at which the encoder/decoder is connected to the second line;
ascertaining, via the measuring unit, an amplitude difference between the measured first and second frequency-selective signals; and ascertaining an asymmetry at inputs of the subscriber line, via the measuring unit based on the amplitude difference circuit.

2. The method of claim 1, which further comprises centrally controlling the steps of: connecting the first line to ground, increasing the resistance of the second line, outputting the audio signal to the first line, measuring the first frequency-selective signal in the first line, connecting the second line to ground, increasing the resistance of the first line, outputting the further audio signal to the second line, and measuring the second frequency-selective signal in the second line.

3. A device for checking a subscriber line circuit with a first and a second electrical line, comprising:
   a tone generator and a frequency-selective measuring unit arranged in an encoder/decoder, wherein the first electrical line and the second electrical line are connected to the encoder/decoder via a subscriber line circuit, wherein the tone generator and the frequency-selective measuring unit are configured to be controlled sequentially depending on a first and a second configuration,
   wherein the first configuration is formed by virtue of a first connection of the first line to ground, by virtue of an increase in a resistance of the second line, by virtue of an output of an audio signal from the tone generator to the first line, and by virtue of a connection of the frequency-selective measuring unit to a point at which the encoder/decoder is connected to the first line, and
   wherein the second configuration is formed by virtue of a second connection of the second line to ground, by virtue of an increase in a resistance of the first line, by virtue of output of an audio signal from the tone generator to the second line, and by virtue of a connection of the frequency-selective measuring unit to a point at which the encoder/decoder is connected to the second line, and
   wherein the measuring unit comprises a differentiator and is configured to ascertain an asymmetry at inputs of the subscriber line circuit.

4. The device of claim 3, further comprising a first controllable switch that connects the first and the second lines to ground.

5. The device of claim 4, further comprising a second controllable switch that connects the tone generator and the measuring unit to the first and the second lines.

6. The device of claim 5, wherein the first and second controllable switches are switched together.

* * * * *